US008634799B1

(12) United States Patent
Economy et al.

(10) Patent No.: US 8,634,799 B1
(45) Date of Patent: Jan. 21, 2014

(54) DYNAMICALLY RE-CONFIGURED INCIDENT SCENE COMMUNICATION BASED ON INCIDENT SCENE FACTORS

(75) Inventors: George R. Economy, Arlington Heights, IL (US); Daniel J. McDonald, Cary, NC (US); Dean M. Picha, Buffalo Grove, IL (US); Mark Shahaf, Vernon Hills, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 3 days.

(21) Appl. No.: 13/597,454

(22) Filed: Aug. 29, 2012

(51) Int. Cl.
*H04M 11/04* (2006.01)

(52) U.S. Cl.
USPC ..... 455/404.1; 455/416; 455/420; 455/453.1; 455/456.3

(58) Field of Classification Search
USPC ............. 455/404.1–404.2, 445, 452.1, 452.2, 455/453, 509, 512, 521, 524, 518, 519, 403, 455/435.1, 456.1–457, 517, 420, 422.1; 370/328, 329, 338, 352, 400, 401, 370/395.42, 395.43, 465, 468
See application file for complete search history.

(56) References Cited

U.S. PATENT DOCUMENTS

| | | | |
|---|---|---|---|
| 5,613,209 A | 3/1997 | Peterson et al. | |
| 6,119,003 A | 9/2000 | Kukkohovi | |
| 6,477,387 B1 * | 11/2002 | Jackson et al. | 455/519 |
| 6,914,894 B2 | 7/2005 | Wilmer et al. | |
| 7,212,832 B2 | 5/2007 | Yokota | |
| 7,974,627 B2 | 7/2011 | Mia et al. | |
| 8,032,139 B2 | 10/2011 | Oommen | |
| 2004/0242240 A1 | 12/2004 | Lin | |
| 2009/0054029 A1 * | 2/2009 | Hogberg et al. | 455/404.2 |
| 2010/0149970 A1 * | 6/2010 | Miranda et al. | 370/229 |
| 2010/0177661 A1 | 7/2010 | Dailey | |
| 2010/0255849 A1 | 10/2010 | Ore | |
| 2010/0317357 A1 | 12/2010 | Miki et al. | |
| 2011/0189997 A1 | 8/2011 | Tiwari et al. | |

FOREIGN PATENT DOCUMENTS

| | | |
|---|---|---|
| EP | 2034794 A1 | 3/2009 |
| WO | 0128276 A1 | 4/2001 |
| WO | 2010090809 A3 | 9/2010 |

OTHER PUBLICATIONS

"3D Building Visualization and Scene Management for Incident Commanders," Kutta Technologies for earth and air, 19 pages.

* cited by examiner

*Primary Examiner* — Vladimir Magloire
*Assistant Examiner* — Babar Sarwar
(74) *Attorney, Agent, or Firm* — Daniel R. Bestor

(57) ABSTRACT

An incident commander computing device dynamically reconfigures subscriber unit usage of radio access networks by first identifying, based at least on a type of incident occurring within a particular geographic area, a first incident response group having a first higher priority for responding to the incident and a second incident response group having a second lower priority for responding to the incident, then identifying a first higher priority radio access network having a sufficient coverage level across the particular geographic area and a second lower priority radio access network having a sufficient coverage level across the particular geographic area, and finally assigning the first incident response group to the first higher priority radio access network and assigning the second incident response group to the second lower priority radio access network.

17 Claims, 6 Drawing Sheets

DYNAMICALLY RE-CONFIGURED INCIDENT SCENE COMMUNICATION BASED ON INCIDENT SCENE FACTORS

FIELD OF THE DISCLOSURE

The present disclosure relates generally to dynamically reconfiguring subscriber unit usage of radio access networks based on a number of determined incident scene factors associated with an incident scene within a particular geographic area.

BACKGROUND OF THE DISCLOSURE

Radio access networks (RANs) provide for radio communication links to be arranged within the system between a plurality of user terminals. Such user terminals may be mobile and may be known as 'mobile stations' or 'subscriber units.' At least one other terminal, e.g. used in conjunction with subscriber units, may be a fixed terminal, e.g. a control terminal, base station, eNodeB, repeater, and/or access point. Such a RAN typically includes a system infrastructure which generally includes a network of various fixed terminals, which are in direct radio communication with the subscriber units. Each of the fixed terminals operating in the RAN may have one or more transceivers which may, for example, serve subscriber units in a given local region or area, known as a 'cell' or 'site', by radio frequency (RF) communication. The subscriber units that are in direct communication with a particular fixed terminal are said to be served by the fixed terminal. In one example, all radio communications to and from each subscriber unit within the RAN are made via respective serving fixed terminals. Sites of neighboring fixed terminals may be offset from one another or may be non-overlapping or partially or fully overlapping.

RANs may operate as a proprietary overlay application, or may operate according to an industry standard protocol such as, for example, the Project 25 (P25) standard defined by the Association of Public Safety Communications Officials International (APCO), or other radio protocols, such as the terrestrial trunked radio (TETRA) standard defined by the European Telecommunication Standards Institute (ETSI), the Digital Mobile Radio (DMR) standard also defined by the ETSI, an open media alliance (OMA) push to talk (PTT) over cellular (OMA-PoC) standard, a voice over IP (VoIP) standard, or a PTT over IP (PoIP) standard. Typically, P25, TETRA, and DMR networks are narrowband managed networks while PoC, VoIP, and PoIP are implemented over broadband networks including third generation and fourth generation networks such as third generation partnership project (3GPP) Long Term Evolution (LTE) networks. Within the narrowband managed networks, P25 and TETRA based RANs are generally recognized as land mobile radio (LMR) networks, and may be more preferred or less preferred by network owners/operators and subscribers compared to other narrowband managed networks such as DMR networks. Within the broadband category, public safety LTE systems (pLTE) may approach or exceed the reliability and performance levels of LMR, while commercial LTE services, over which PoC, VoIP, and PoIP services are provided, may be considered equivalent or lower performing compared to DMR. Communications in accordance with any one or more of these standards, or other standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber units in RANs such as those set forth above send user communicated speech and data, herein referred to collectively as 'traffic information', in accordance with the designated protocol.

Many public safety RANs provide for group-based radio communications amongst a plurality of subscriber units such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another, while avoiding the random transmissions of radio users outside of the local police force.

When an event or incident occurs, such as a fire or accident, numerous different groups may respond to the incident, including for example, direct first responders such as police, fire, and medical groups and supporting responders such as utility, traffic control, crowd control groups, among others. Each of these groups may attempt to, and may actually secure, resources on one or more of the RANs available at the incident location. Given the limited availability of RF resources on any one RAN available at the incident location, however, subscriber units that are members of either of the direct first responders groups and the supporting responders groups may be unable to secure RF resources on the same RAN or on a preferred RAN, resulting in an inability of some members of each group to communicate with other members of the group on the same or on other RANs, and/or resulting in lower priority groups such as supporting responders groups obtaining RF resources at the expense of higher priority groups such as direct first responders groups. One RAN may be preferred over another RAN for a number of reasons. For example, subscriber units operating on a managed public safety narrowband RAN are normally granted elevated quality of service (QoS) levels that may not be granted, or may not be granted to the same extent, when operating on commercial LTE RANs, or other types of RANs. To the extent that subscriber units that are members of supporting responders groups secure RF resources on the managed public safety narrowband RANs at the expense of subscriber units that are members of direct first responders groups, the direct first responders groups may experience reduced services, features, and/or reliability.

For example, as shown in FIG. 1, a conventional incident scene 100 may have an incident center 102 and may have an incident boundary 104 manually or automatically defined surrounding the incident center 102, thereby defining a particular geographic area within the boundary 104 that is associated with the incident. Various incident responders (each of which may be a member of a corresponding incident response group) may already be on scene or within the incident boundary 104 at the time of the incident, including for example, a traffic control responder SU 114 and a utility responder SU 110. Each of these incident responder SUs may, in one example, already be actively using RF resources of a preferred RAN, such as a LMR RAN providing coverage substantially across the particular geographic area (e.g., within the incident boundary 104). However, as new incident response groups or as additional members of already existing incident response groups arrive within the incident boundary 104 and attempt to secure additional RF resources from the more preferred LMR RAN, including for example additional utility incident responder SU 112 moving from position 112A to 112B and finally to 112C within the incident boundary 104 and additional traffic control incident responder SU 116 moving from position 116A to 116B and finally to 116C within the incident boundary 104, all available RF resources at the more preferred LMR RAN may become used such that no additional (or insufficient) RF resources are available for subsequent incident responders or incident response groups. For example, subsequently arriving fire incident responder 120 (moving from position 120A to position 120B and finally to position 120C within the incident boundary 104) and subsequently arriving police incident responder 122 (moving from position 122A to position 122B and finally to position 122C within the incident boundary 104) may be unable to secure RF resources at the more preferred LMR RAN, and as a result, may be relegated to a less preferred (in one example) DMR or LTE based RAN for their group communications that may or may not provide sufficient coverage across the particular geographic area associated with the incident.

Accordingly, there is a need for a solution that would allow a controlling entity to determine the RANs that provide sufficient coverage in a particular geographic area associated with an incident, and to reassign members of various incident response groups to the determined available RANs based on one or more of the types of RANs determined available, the RF resources available at the determined available RANs, the communications abilities of the members of the various incident response groups, the assigned priorities of the determined available RANs, the assigned priorities of the incident response groups, the type of incident, and the location of the incident, among other factors.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
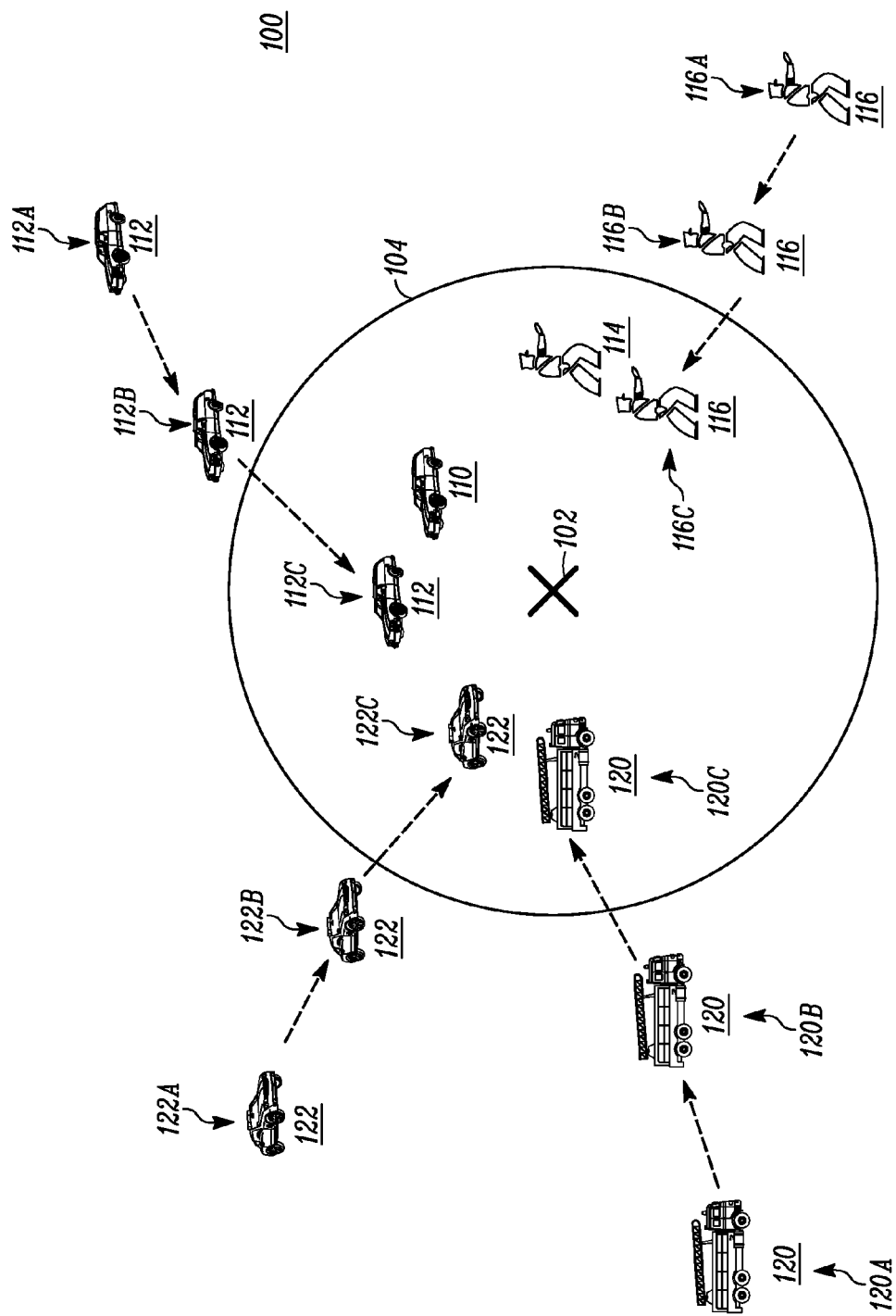
FIG. 1 is a schematic diagram of a conventional incident scene illustrating issues that may arise upon arrival of incident responders.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

In light of the foregoing, it would be advantageous to provide for a system and method that allows a controlling entity such as an incident controller computing device to identify a plurality of different radio access networks (RANs) that provide coverage in a particular area associated with an incident, and to reassign members of various incident response groups responding to the incident to respective ones of the identified RANs based on one or more of the types of RANs determined available, the radio frequency (RF) resources available at the determined available RANs, the communications abilities of the members of the various incident response groups, the assigned priorities of the determined available RANs, the type of incident, the relative priorities of the incident response groups, and/or the location of the incident, among other factors.

In one embodiment, a method for dynamically reconfiguring subscriber unit usage of radio access networks includes an incident commander computing device dynamically reconfiguring subscriber unit usage of radio access networks by first identifying, based at least on a type of incident occurring within a particular geographic area, a first incident response group having a first higher priority for responding to the incident and a second incident response group having a second lower priority for responding to the incident, then identifying a first higher priority radio access network having a sufficient coverage level across the particular geographic area and a second lower priority radio access network having a sufficient coverage level across the particular geographic area, and finally assigning the first incident response group to the first higher priority radio access network and assigning the second incident response group to the second lower priority radio access network.

In another embodiment, an incident commander computing device dynamically reconfigures subscriber unit usage of radio access networks by first identifying, based at least on a type of incident occurring within a particular geographic area, a first incident response group having a first higher priority for responding to the incident and a second incident response group having a second lower priority for responding to the incident, then identifying a first higher priority radio access network having a sufficient coverage level across the particular geographic area and a second lower priority radio access network having a sufficient coverage level across the particular geographic area, and finally assigning the first incident response group to the first higher priority radio access network and assigning the second incident response group to the second lower priority radio access network.

Each of the above-mentioned embodiments will be discussed in more detail below, starting with example network and device architectures of the system in which the embodiments may be practiced, followed by a discussion of dynamic radio access network reassignment from the point of view of the incident controller computing device and of the subscriber unit. Further advantages and features consistent with this disclosure will be set forth in the following detailed description, with reference to the figures.

I. NETWORK AND DEVICE ARCHITECTURES

Figure 2:
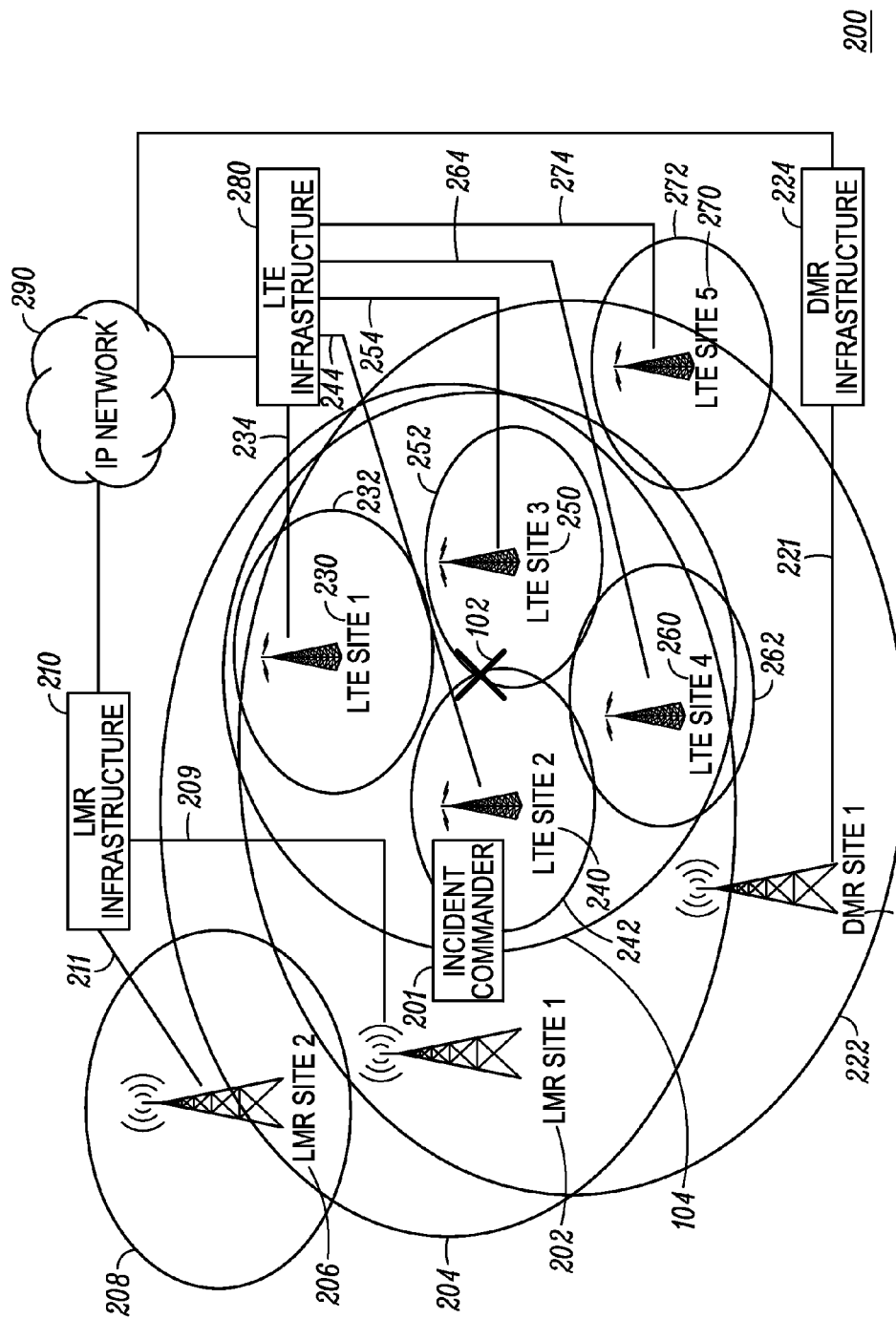
FIG. 2 is a block diagram of an incident scene and associated particular geographic area having a plurality of overlaying radio access networks and supporting infrastructure in accordance with an embodiment.

FIG. 2 shows an example geographic layout 200 including an incident scene location 102 and surrounding particular geographic area (e.g., within incident boundary 104) across which a plurality of different types of RANs are deployed, and at which an incident commander (IC) computing device 201 may be adapted in accordance with one or more embodiments of the disclosure. It will be apparent to those skilled in the art that the geographic layout 200 and the components which are to be described as operating therein may take a number of forms well known to those skilled in the art. Thus, the positions of elements in the example geographic layout 200 and of operational components to be described as operating therein, should be regarded as illustrative rather than limiting.

Similar to FIG. 1, the example geographic layout 200 shown in FIG. 2 includes an incident center 102 and incident boundary 104 (defining a particular geographic area surrounding the incident center 102) similar to that set forth in FIG. 1. The incident boundary 104 that defines the particular geographic area may be determined as a preconfigured or dynamically determined distance-based location criterion, such as a radius, relative to the incident center 102, of for example 0.5 miles, 1 mile, 2 miles, or 5 miles from the incident center 102. Of course, other methods of defining a geographic area than specifying distance may be used, including specifying geographic boundaries (e.g., west of latitude 46', north of longitude 35'), specifying street boundaries (e.g., north of the Eisenhower expressway, west of the Kennedy expressway), or specifying some other regular or irregular shape surrounding the incident center 102, among other possibilities.

In addition, a number of RANs providing coverage throughout and adjacent to the particular geographic area are illustrated in FIG. 2 with exemplary corresponding coverage areas. More specifically, a LMR RAN includes a first LMR site 1 202 and corresponding coverage area 204 provides LMR radio access across substantially the entire particular geographic area, while a second LMR site 2 206 and corresponding coverage area 208 provides LMR radio access adjacent to and outside of the particular geographic area. Both the first LMR site 1 202 and the second LMR site 2 206 are communicatively coupled to an LMR infrastructure 210. In addition, a DMR RAN includes a first DMR site 220 and corresponding coverage area 222 provides DMR radio access across substantially the entire particular geographic area. The DMR site 220 is communicatively coupled to a DMR infrastructure 224. Further, a plurality of Long Term Evolution (LTE) sites provide commercial LTE radio access across substantially the entire particular geographic area (including LTE site 1 230 and corresponding coverage area 232, LTE site 2 240 and corresponding coverage area 242, LTE site 3 250 and corresponding coverage area 252, and LTE site 4 260 and corresponding coverage area 262) while a single LTE site provides LTE radio access adjacent to and outside of the particular geographic area (LTE site 5 270 and corresponding coverage area 272). Each of the LTE sites 230, 240, 250, 260, and 270 are communicatively coupled to an LTE infrastructure 280. Each of the LMR infrastructure 210, the DMR infrastructure 224, and LTE infrastructure 280 is additionally and correspondingly communicatively coupled to one another through an IP network 290. The IP network 290 may be any local or wide area network (such as the Internet), and may be comprised of any number of routers, switches, gateways, and other networking equipment for interconnecting the various radio infrastructures 210, 224, and 280 with one another.

Each of the first and second LMR sites site 1 202 and site 2 206 may include one or more fixed terminals (e.g., base stations/repeaters/control terminals) (LMR BSs) which may be operably connected to the LMR system infrastructure 210 via respective wired or wireless links 209, 211. While the term BS will be used to refer to the fixed terminals, for ease of reference, it should be noted that the fixed terminals may, in some embodiments, be a repeater or a control terminal, or some other type of fixed terminal. Each LMR BS may have radio links with a plurality of subscriber units, particularly subscriber units (SUs) in the respective coverage area or service cell (204, 208 respectively) at least partially defined by a geographic location of the LMR BS. In addition to SUs, each LMR BS may maintain a link with a dispatch console or other operator in the LMR infrastructure 210. The dispatch console may be configured to act as a communications client of one or both of the LMR BSs, and in some embodiments, may provide the IC 201 functions discussed throughout the specification. SUs within the coverage area of each LMR BS may register with and subsequently receive wireless communications services from the respective LMR BS via corresponding radio links. The LMR BS serves SUs with radio communications to and from other terminals, the other terminals including (i) other SUs served by the LMR BS, (ii) SUs served by other LMR BSs, (iii) other SUs at other RANs operably linked to the LMR BS via the LMR infrastructure 210, and (iv) the dispatch console. For example, a SU such as a fire incident responder SU 120 arriving at position 120C and within coverage area 204 may be able to register with, and receive wireless communications services from, a LMR BS at LMR radio site 202 via respective radio links, assuming the SU contains corresponding programming and/or hardware capable of communicating with the LMR radio site 202.

Each of the LMR BSs may operate as a conventional radio site or a trunked radio site. In a conventional radio system, a plurality of SUs are formed into groups. Each group uses an associated channel (shared or separate) for communication. Thus, each group is associated with a corresponding channel, and each channel can only be used by one group at any particular moment in time. Channels may be divided by frequency, time, and/or code. In some systems, multiple groups may operate on the same channel, and may use a unique group ID embedded in the group communications to differentiate them. In a trunked radio system, SUs use a pool of channels for virtually an unlimited number of groups. Thus, all groups are served by all channels. For example, in a trunking system, all SUs operating at a radio site idle on an initial designated control channel or rest channel and when a new call is requested over the control or rest channel, is assigned a traffic channel for the new group call while remaining SUs not participating in the new group call stay on the initial designated control channel or rest channel. Other conventional and trunked configurations are possible as well.

The LMR infrastructure 210 includes known sub-systems required for operation of the LMR RAN. Such sub-systems may include, for example, sub-systems providing authentication, routing, SU registration and location, system management and other operational functions within the LMR RAN. In some embodiments, a radio network controller (RNC), such as a zone controller (ZC), may provide for some or all of the authentication, routing, SU registration and location, system management and other operational functions for their corresponding zone. The LMR infrastructure 210 may additionally provide routes to other RAN infrastructures via one or more routers, switches, or gateways within the LMR infrastructure 210 and via IP network 290, and/or may provide access to other types of networks such as a plain old telephone system (POTS) network.

The DMR site 1 220 may similarly include one or more fixed terminals (DMR BSs) which may be operably connected to the DMR system infrastructure 224 via respective wired or wireless links 221. Each DMR BS may have radio links with a plurality of SUs, particularly SUs in the respective coverage area or service cell 222 at least partially defined by a geographic location of the DMR BS. In addition to SUs, the DMR BS may maintain a link with a dispatch console or other operator in the DMR infrastructure 224. The dispatch console may be configured to act as a communications client of the DMR BS, and in some embodiments, may provide the IC 201 functions discussed throughout the specification. SUs within the coverage area of the DMR BS may register with and subsequently receive wireless communications services from the DMR BS via corresponding radio links. The DMR BS serves SUs with radio communications to and from other terminals, the other terminals including (i) other SUs served by the DMR BS, (ii) SUs served by other DMR BSs, (iii) other SUs in other RANs operably linked to the DMR BS via the DMR infrastructure 224, and (iv) the dispatch console. For example, a SU such as a fire incident responder SU 120 arriving at position 120C and within coverage area 222 may be able to register with, and receive wireless communications services from, a DMR BS at DMR radio site 220 via respective radio links, assuming the SU contains corresponding programming and/or hardware capable of communicating with the DMR radio site 220. The DMR BS may operate as a conventional radio site or a trunked radio site.

The DMR infrastructure 224 includes known sub-systems required for operation of the DMR RAN. Such sub-systems may include, for example, sub-systems providing authentication, routing, SU registration and location, system management and other operational functions within the DMR RAN. In some embodiments, a RNC, such as a ZC, may provide for some or all of the authentication, routing, SU registration and location, system management and other operational functions for their corresponding zone. The DMR infrastructure 224 may additionally provide routes to other RAN infrastructures via one or more routers, switches, or gateways within the DMR infrastructure 224 and via IP network 290, and/or may provide access to other types of networks such as a POTS network.

Each of the first through fifth LTE sites 230, 240, 250, 260, 270 may include one or more fixed terminals (LTE eNodeBs) which may be operably connected to the LTE system infrastructure 280 via respective wired or wireless links 234, 244, 254, 264, 274. Each LTE eNodeB may have radio links with a plurality of SUs, particularly SUs in the respective coverage area or service cell (232, 242, 252, 262, 272 respectively) at least partially defined by a geographic location of the LTE eNodeB. In addition to SUs, each LTE eNodeB may maintain a link with a dispatch console or other operator in the LTE infrastructure 280. The dispatch console may be configured to act as a communications client of one or all of the LTE eNodeBs, and in some embodiments, may provide the incident commander 201 functions discussed throughout the specification. SUs within the coverage area of each LTE eNodeB may register with and subsequently received wireless communications services from the respective LTE eNodeB via corresponding radio links. The LTE eNodeB serves SUs with radio communications to and from other terminals, the other terminals including (i) other SUs served by the LTE eNodeB, (ii) SUs served by other LTE eNodeBs, (iii) other SUs in other RANs operably linked to the LTE eNodeB via the LTE infrastructure 280, and (iv) the dispatch console. For example, a SU such as fire incident responder SU 120 arriving at position 120C and within coverage area 242 may be able to register with, and receive wireless communications services from, an LTE eNodeB at LTE radio site 240 via respective radio links, assuming the SU contains corresponding programming and/or hardware capable of communicating with the LTE radio site 240.

Each of the LTE eNodeBs may operate as a dedicated public safety access node, or may operate as a commercial access node over which temporary or reserved public safety access is licensed or leased. While the reliability and performance of public safety LTE may approach or exceed that of LMR (and thus, be assigned a priority equivalent to or above LMR in some examples), for the purposes of this disclosure, we will assume that the LTE services provided are commercial LTE services have a reliability and/or performance metric equivalent to or below that of DMR. Communications sent over the LTE eNodeBs may be one of a varied number of communications types, including data, voice (including push to talk (PTT) over cellular (PoC), voice over IP (VoIP), or PTT over IP (PoIP), among others), audio, video, audio/video, or some other type of media, perhaps transmitted using one or more other voice or data protocols such as real-time transport protocol (RTP) or session initiation protocol (SIP). Group call distribution may be handled at the LTE infrastructure via repeated IP unicast transmissions, IP multicast transmissions, IP broadcast transmissions, or enhanced multicast broadcast multimedia service (MBMS), among other possibilities.

The LTE infrastructure 280 includes known sub-systems required for operation of the LTE RAN. Such sub-systems may include, for example, sub-systems providing authentication, routing, SU registration and location, system management and other operational functions within the LTE RAN. For example, the LTE infrastructure 280 may include an evolved packet core which itself may include one or more devices including, for example, a serving gateway (S-GW), a mobile management entity (MME), a home subscriber server (HSS), a Policy and Charging Rules Function (PCRF), and a packet data network (PDN) gateway (P-GW). The S-GW may function to route and forward data packets, while also acting as a mobility anchor for the user data plane during inter-eNodeB handovers and as the anchor for mobility between LTE and other 3GPP technologies, among other possibilities. The MME may function to track and page idle SUs, authenticate SUs (via interactions with the HSS), enforce SU roaming restrictions, and handle security, key management, among other possibilities. The HSS may provide a central database that contains user-related and subscription-related information and may aid in SU system roaming, call and session establishment support, and user authentication and access authorization. The PCRF may function to provide charging and credit control for user data flows, and may provide for QoS assignments to user data flows. The P-GW may function to provide connectivity from the served SUs to external packet data networks (such as IP network 290 or a POTS network) by being the point of exit and entry of traffic for the SUs. The P-GW may also be involved in performing policy enforcement, packet filtering, and charging support. Fewer or more, and other types of, infrastructure devices may also be present and/or incorporated into the evolved packet core.

The IC computing device 201, while illustrated in FIG. 2 as being a separate SU client device deployed within the coverage area 204 of and connected to LMR site 1 202 via a radio link, may alternatively be disposed at any other location in the example geographic layout 200 illustrated in FIG. 2 so long as it has wired and/or wireless connectivity to one of the RANs in FIG. 2 that is communicatively coupled to the other RANs via some network such as IP network 290. Furthermore, and for example, the IC computing device 201 functionality may instead be integrated with a dispatch console or some other device within LMR infrastructure 210, within DMR infrastructure 224, or within LTE infrastructure 280. In one embodiment, the IC computing device 201 may be disposed within IP network 290, as long as access is provided to each of the RANs (e.g., LMR, LTE, and DMR infrastructures in the example of FIG. 2). Other implementation possibilities exist as well.

Figure 3:
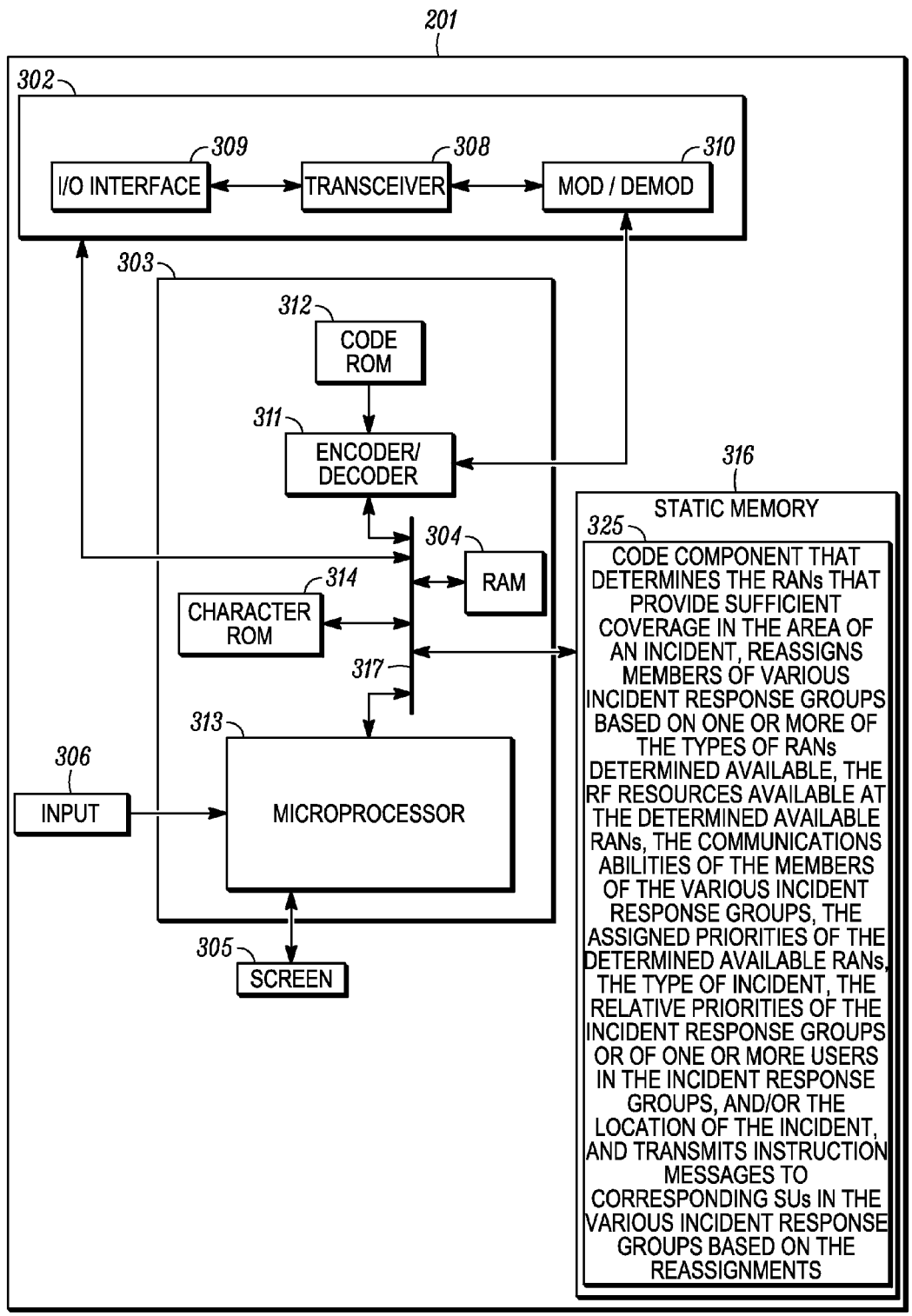
FIG. 3 is a block diagram of an incident commander computing device capable of operating at the incident scene of FIG. 2 in accordance with an embodiment.

FIG. 3 is an example functional block diagram of an IC computing device 201 operating within the example geographic layout 200 of FIG. 2 in accordance with some embodiments. As shown in FIG. 3, IC 201 includes a communications unit 302 coupled to a common data and address bus 317 of a processing unit 303. The IC 201 may also include an input unit (e.g., keypad, pointing device, etc.) 306 and a display screen 305, each coupled to be in communication with the processing unit 303.

The processing unit 303 may include an encoder/decoder 311 with an associated code Read Only Memory (ROM) 312 for storing data for encoding and decoding voice, data, control, or other signals that may be transmitted or received between BSs, eNodeBs, SUs, or other infrastructure devices in one or more of the RANs illustrated in FIG. 2. The processing unit 303 may further include a microprocessor 313 coupled, by the common data and address bus 317, to the encoder/decoder 311, a character ROM 314, a Random Access Memory (RAM) 304, and a static memory 316.

The communications unit 302 may include one or more wired or wireless input/output (I/O) interfaces 309 that are configurable to communicate with BSs, eNodeBs, SUs, or other infrastructure devices in one or more of the RANs illustrated in FIG. 2. The communications unit 302 may include one or more wireless transceivers 308, such as a DMR transceiver, an APCO P25 transceiver, a TETRA transceiver, an LTE transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 302 may alternatively or additionally include one or more wireline transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding or encoding data such as control or instruction messages, RAN assignment messages, and/or data or voice messages that may be transmitted or received by the IC 201. Static memory 316 may store operating code 325 for the microprocessor 313 that, when executed, determines the RANs that provide sufficient coverage in the area of an incident, reassigns members of various incident response groups based on one or more of the types of RANs determined available, the RF resources available at the determined available RANs, the communications abilities of the members of the various incident response groups, the assigned priorities of the determined available RANs, the type of incident, the relative priorities of the incident response groups or of one or more users in the incident response groups, and/or the location of the incident, and transmits instruction messages to corresponding SUs in the various incident response groups based on the reassignments, in accordance with one or more of FIGS. 2-6 and corresponding text. Static memory 316 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

Figure 4:
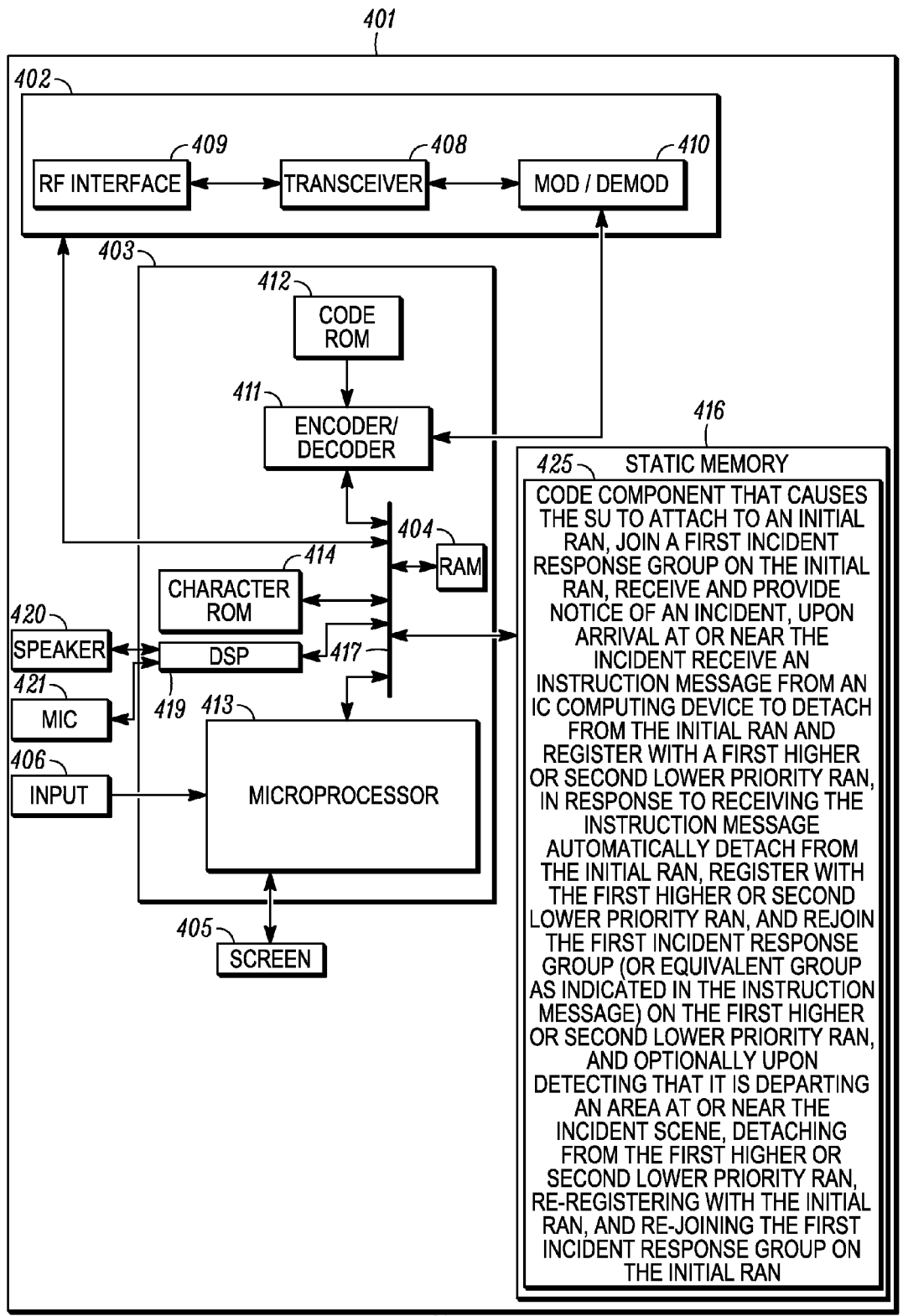
FIG. 4 is a block diagram of an illustrative layout of a subscriber unit capable of operating at the incident scene of FIG. 2 in accordance with an embodiment.
Figure 5:
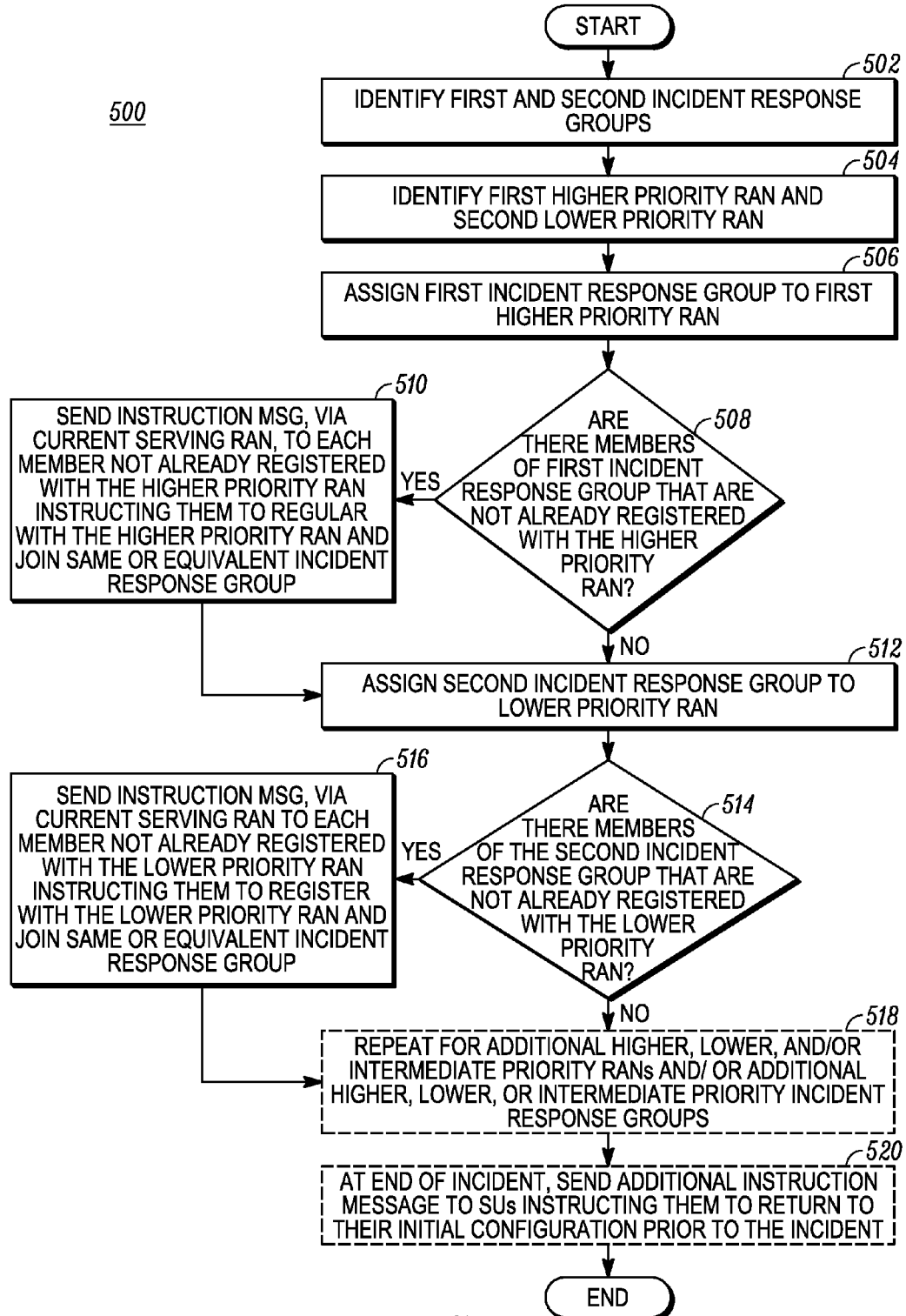
FIG. 5 is a flow chart illustrating processing steps executed at an incident commander computing device at the incident scene of FIG. 2 in accordance with an embodiment.

FIG. 4 is an example functional block diagram of a SU such as the fire incident responder SU 120 of FIG. 1 and that may operate on one or more (or all) of the RANs illustrated in FIG. 2. Other SUs of other incident responders may contain same or similar structures. As shown in FIG. 5, SU 401 includes a communications unit 402 coupled to a common data and address bus 417 of a processing unit 403. The SU 401 may also include an input unit (e.g., keypad, pointing device, etc.) 406, an output transducer unit (e.g., speaker) 420, an input transducer unit (e.g., a microphone) 421, and a display screen 405, each coupled to be in communication with the processing unit 403.

The processing unit 403 may include an encoder/decoder 411 with an associated code ROM 412 for storing data for encoding and decoding voice, data, control, or other signals that may be transmitted or received between other BSs, eNodeBs, or SUs in the same radio site as BS 401. The processing unit 403 may further include a microprocessor 413 coupled, by the common data and address bus 417, to the encoder/decoder 411, a character ROM 414, a RAM 404, and a static memory 416. The processing unit 403 may also include a digital signal processor (DSP) 419, coupled to the speaker 420, the microphone 421, and the common data and address bus 417, for operating on audio signals received from one or more of the communications unit 402, the static memory 416, and the microphone 421.

The communications unit 402 may include an RF interface 409 configurable to communicate with other SUs within its communication range and with BSs and eNodeBs within its communication range. The communications unit 402 may include one or more wireless transceivers 408, such as an APCO P25 transceiver, a DMR transceiver, an LTE transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. For example, the communications unit 402 may include an LMR-based transceiver, a DMR-based transceiver, and an LTE-based transceiver, among others. The transceiver 408 is also coupled to a combined modulator/demodulator 410 that is coupled to the encoder/decoder 411. The character ROM 414 stores code for decoding or encoding data such as control or instruction messages, RAN assignment messages, and/or data or voice messages that may be transmitted or received by the SU 401.

Static memory 416 may store operating code 425 for the microprocessor 413 that, when executed, causes the SU to attach to an initial RAN, join a first incident response group on the initial RAN, receive and provide notice of an incident, upon arrival at or near the incident receive an instruction message from an IC computing device to detach from the initial RAN and register with a first higher priority or second lower priority RAN, in response to receiving the instruction message automatically detach from the initial RAN, register with the first higher or second lower priority RAN, and rejoin the first incident response group (or equivalent group as indicated in the instruction message) on the first higher or second lower priority RAN, and optionally upon detecting that it is departing an area at or near the incident scene, detaching from the first higher or second lower priority RAN, re-registering with the initial RAN, and re-joining the first incident response group on the initial RAN, in accordance with one or more of FIGS. 2-6 and corresponding text. Static memory 416 may comprise, for example, a HDD, an optical disk drives such as a CD drive or DVD drive, a SSD, a tape drive, a flash memory drive, or a tape drive, to name a few.

II. DYNAMIC INCIDENT SCENE RECONFIGURATION PROCESS FLOWS

Figure 6:
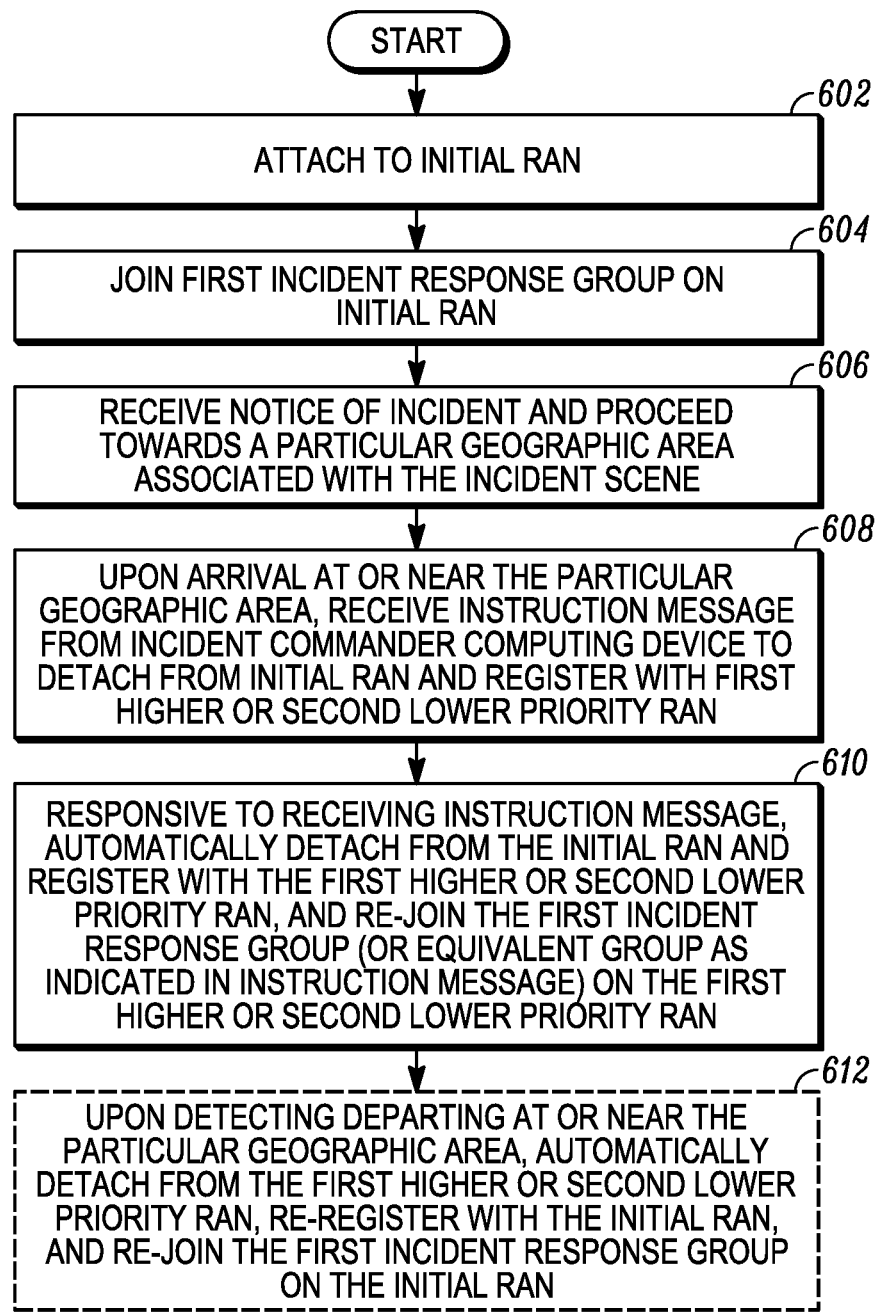
FIG. 6 is a flow chart illustrating processing steps executed at a subscriber unit at the incident scene of FIG. 2 in accordance with an embodiment.

FIGS. 5-6 set forth example flows of a dynamic reconfiguration of incident scene communications that may be executed at an IC computing device and at a SU in accordance with some embodiments. In the examples set forth in detail below, only particular sequences are disclosed with respect to the IC (FIG. 5) and the SU (FIG. 6). Of course, additional steps not disclosed herein could be additionally added before, after, or in-between steps disclosed in FIGS. 5 and 6, and the presence of such additional steps would not negate the purpose and advantages of the examples set forth in detail throughout the remainder of this disclosure. Steps drawn with a dashed outline in FIGS. 5 and 6 should be understood to be optional steps. Further details regarding the process flows of FIGS. 5-6 will be first set forth with regard to the IC in FIG. 5, and then with the SU in FIG. 6, below.

FIG. 5 sets forth a method 500 executable at an IC computing device, such as IC 201 of FIG. 3, for dynamically reconfiguring incident scene communications across a plurality of different RANs. IC may be preconfigured or pre-populated with coverage maps for supported RANs such that, given a location of an incident (e.g., its GPS position, its triangulated position, a SU's GPS position or triangulated position as a surrogate for the incident location, or a position of a BS or eNodeB servicing a SU reporting the incident and used as a surrogate for the incident location) can determine not only which RANs provide sufficient coverage (e.g., within some confidence interval of providing a threshold level of coverage, such as at least 75% coverage, 90% coverage, or 99% coverage over an area within the incident location or boundary) within a particular geographic area covering the incident location (and perhaps some predetermined radius or distances extending from the incident location, such as 100 yards, 200 yards, 500 yards, or 1000 yards, to an incident boundary), but also a relative priority or preference of those determined RANs relative to one another.

For example, given an incident location, the IC may access a coverage database (maintained locally or obtained elsewhere in the IP network 290 or via messaging with databases at each of the infrastructures 210, 224, and 290) and determine that the following wireless communication networks are available as set forth in Table I:

TABLE I

Example Incident Location Coverage Look-up Table

| RAN Site ID(s) | Type | Relative Priority | Additional Parameters |
|---|---|---|---|
| 0 | LMR | 1 | 98%, 80% |
| 1 | DMR | 2 | 95%, 15% |
| 2-5 | LTE | 3 | 90%, 30% |

For example, the IC may determine that an LMR RAN with a site ID of "0" is available, has an assigned high relative priority of 1, provides an estimated 98% coverage in the particular geographic area associated with the incident, and is currently experiencing an 80% RF load. Further, the IC may determine that a DMR RAN with a site ID of "1" is available, has an assigned medium relative priority of 2, provides an estimated 95% coverage in the particular geographic area associated with the incident, and is currently experiencing a 15% RF load. Finally, the IC may determine that an LTE RAN with site IDs of "2-5" is available, has an assigned relative priority level of 3, provides an estimated 90% coverage in the particular geographic area associated with the incident, and is currently experiencing a 30% RF load. In other examples, additional or different types of radio RANs may be found, different relative priorities assigned to the types of radio RANs, and additional or different parameters obtained relative to those RANs (including, in some examples, an identity of an associated control, traffic, or rest channel associated with the RAN).

Additionally, the IC may be preconfigured or pre-populated with incident response groups and their associated priorities relative to one another such that, given a type of incident (e.g., fire, accident, water, hostage, breaking & entering, etc.) can determine not only which responder groups should be triggered as needing to respond (and perhaps requesting their presence at the incident scene), but also their relative priorities for use in dynamically reconfiguring SU use of RANs in and around the incident scene.

For example, given an incident type (e.g., perhaps indicated via a first responder on the scene, or indicated via a dispatcher at a console device), the IC may access a responder group database (e.g., maintained locally or obtained elsewhere in the IP network 290 or via messaging with databases at each of the infrastructures 210, 224, and 290 of FIG. 2) and determine that the following incident response groups should be summoned to the particular geographic area associated with the incident scene and assigned to RANs in accordance with their corresponding relative priorities:

TABLE II

Example Incident response group Look-up Table

| Reported Incident Type | Incident Response Group(s) | Relative Priority |
|---|---|---|
| House Fire | Fire Dept. | 1 |
| | Ambulance | 1 |
| | Crowd Control | 2 |
| Car Accident | Fire Dept. | 1 |
| | Ambulance | 1 |
| | Traffic Control | 2 |
| | Utility/Towing | 3 |
| Water Rescue | Coast Guard | 1 |
| | Ambulance | 1 |
| | Boat Recovery/Tow | 3 |

For example, the IC may determine that, for an accident incident type, a fire department incident response group, an ambulance incident response group, a traffic control incident response group, and a utility/towing incident response group should be dispatched to the incident location. Furthermore, most preferred (e.g., highest assigned priority) available RANs determined to provide sufficient coverage across the particular geographic area should be assigned first to the fire department incident response group and ambulance incident response group, and then depending on availability, the most preferred or less preferred available RANs should be assigned to the traffic control incident response group, and then depending on availability, the most preferred, less preserved, or least preferred available RANs should be assigned to the utility/towing incident response group, etc. Other examples could include more or less incident types, different incident types, different mappings of incident types to incident response groups, different assignments of relative priorities to incident response groups, different assignments of relative priorities to different types of RANs, and/or the inclusion of additional information such as number or identity of subscriber units in each incident response group, among other possibilities. Furthermore, which incident response groups are assigned to any particular type of incident could vary based on a number of factors, including a size of the incident (large or small), a priority of the incident relative to other incidents (e.g., based on involved persons, proximity to other high value targets or high population centers), and a location of the incident (e.g., distance from responder origination locations, proximity to other high value targets or high population centers), among other factors.

At step 502, perhaps responsive to receiving a notification of a type of incident taking place at an incident location (and within a particular geographic area associated with the incident), the IC identifies at least a first and second incident response group, where the first and second incident response groups have different relative priorities, perhaps using an incident response group look-up table similar to that set forth above. For example, the first incident response group may be a direct responder group such as police, ambulance, or fire having a higher priority level of 1, while the second incident response group may be a supporting responder group such as utility, towing, or crowd or traffic control having a relative priority level of 2 or 3. Other examples are possible as well, including examples where only one or where more than two incident response groups are identified, where different types of groups are identified, and where different group priorities are assigned, among other options.

At step 504, and again perhaps responsive to receiving a notification of a type of incident taking place at an incident location, the IC identifies a first higher priority RAN and a second lower priority RAN, perhaps creating or accessing an incident location coverage table similar to that set forth above, and perhaps created via information retrieved from one or more coverage databases. For example, the IC may identify a first higher priority available LMR RAN having a relative priority level of 1 and a second lower priority available DMR RAN having a relative priority level of 2, both providing a sufficient (e.g., threshold level) of coverage across the particular geographic area associated with the incident. In some embodiments, the IC may further identify additional higher or lower priority RANs, including a third still lower priority available LTE RAN having a relative priority level of 3. Those additional RANs determined to be in the area of the incident scene but perhaps not meeting a threshold level of coverage (such as LMR site 2 206 and LTE site 5 270 in FIG. 2), or for some other reason, may be eliminated from consideration at this step (e.g., not 'identified') or in subsequent steps (such as step 506, where the IC refrains from assigning incident response groups to the insufficient coverage site). Other reasons could include insufficient radio frequency (RF) resources to support a number of subscriber units in the first or second incident response group, incompatible communication abilities of SUs, insufficient security controls, insufficient funds or accounts to operate on a commercial RAN requiring remuneration, and insufficient service availability due to a failure or due to being in a maintenance mode, among other reasons.

At step 506, the IC may dynamically assign the identified first incident response group (having a higher priority level) to the first higher priority RAN (assuming the first higher priority RAN has sufficient RF resources available to support the first incident response group, or that sufficient RF resources can be made available by moving other SUs or groups off of the first higher priority RAN). In one embodiment, in the event that the IC identified in a prior step that another even higher priority RAN is available, but that some minimal coverage level or RF resource availability level cannot be met, the IC may at step 506 refrain from assigning the another even higher priority RAN to the first incident response group, or any other incident response group associated with the incident type. In another embodiment, in the event that the IC determines that an identified RAN with a highest relative priority level and sufficient threshold coverage within the boundary area does not have sufficient RF resources (or that sufficient SUs or groups cannot be moved off of the highest relative priority level RAN) to support the first incident response group (having the highest incident response group priority level), the IC may refrain from assigning the first incident response group to the highest priority RAN and instead continue down the determined list of available RANs determined to have sufficient coverage in the particular geographic area associated with the incident scene, in order of priority, until one is found that can support the first incident response group.

Assuming that the first incident response group is assigned to the first higher priority RAN (for example, the LMR RAN set forth above), processing proceeds to step 508 where the IC determines if there are any members of the first incident response group that are not already registered with the first higher priority RAN. If the IC determines that there is at least one member of the first incident response group that is not already registered with the first higher priority RAN (e.g., is instead perhaps registered with one of the lower relative priority RANs), processing proceeds to step 510 where the IC causes an instruction message to be sent to each SU that is a member of the first incident response group but is not already registered with the first higher priority RAN, via the RAN that the SU is currently registered with, instructing the SU to detach from its current RAN and register with the first higher priority RAN.

The instruction message may originate with the IC and travel directly or via the respective RAN to the target SU(s), or may be caused to be generated by a dispatch console or some other infrastructure device within the target SU's current RAN at the IC's request and then travel directly or via the respective RAN to the target SU. Included within the instruction message may be an identity of the first higher priority RAN (including, perhaps, an identity of where a control channel or traffic channel can be found for that first higher priority RAN) and an identity of the same incident response group or (different but) equivalent incident response group (e.g., "local fire" vs. "fire response") that the SU should join once registered with the first higher priority RAN. Once all members of the first incident response group are instructed to move to the first higher priority RAN (or perhaps after all members of the first incident response group are confirmed to have moved to the first higher priority RAN), processing proceeds from step 510 to step 512. Returning briefly to step 508, if the IC determines that all members of the first incident response group are already registered with the first higher priority RAN, processing proceeds to step 512.

At step 512, the IC may dynamically assign the identified second incident response group (having a lower priority level) to the second lower priority RAN (assuming the second lower priority RAN has sufficient RF resources available to support the second incident response group, or that sufficient RF resources can be made available by moving other SUs or groups off of the second lower priority RAN). In one embodiment, in the event that the IC determines that the second lower priority RAN does not have sufficient RF resources (or that sufficient SUs or groups cannot be moved off of the second lower relative priority level RAN) to support the second incident response group (having the lower incident response group priority level), the IC may continue down the determined list of RANs determined to be available in the particular geographic area associated with the incident scene, in order of priority, until one is found that can support the first incident response group, including a RAN having a priority even lower than the second lower priority RAN such as an LTE RAN in the example above.

Assuming that the second incident response group is assigned to the second lower priority RAN (for example, the DMR RAN in the example above), processing proceeds to step 514 where the IC determines if there are any members of the second incident response group that are not already registered with the second lower priority RAN. In at least one alternative embodiment, the IC may instead determine at step 514 whether there are any SUs on a RAN having a higher relative priority than the second lower priority RAN, and in subsequent steps only move those SUs using higher priority RANs (relative to the second lower priority RAN) down to the second lower priority RAN (while leaving SUs belonging to the second incident response group but currently on even lower priority RANs (relative to the second lower priority RAN) and not moving them to the second lower priority RAN).

In any event, if the IC determines that there is at least one member of the first incident response group that is not already registered with the second lower priority RAN (e.g., is instead perhaps registered with one of the first higher priority RAN (LMR) or an even lower relative priority RAN (LTE)), processing proceeds to step 516 where the IC causes an instruction message to be sent to each SU that is a member of the second incident response group but is not already registered with the second lower priority RAN, directly or via the respective RAN that the SU is currently registered with, instructing the SU to detach from its current RAN and register with the second lower priority RAN.

The instruction message may originate with the IC and travel directly or via the respective RAN to the target SU(s), or may be caused to be generated by a dispatch console or some other infrastructure device within the SU's current RAN at the IC's request and then travel directly or via the respective RAN to the target SU. Included within the instruction message may be an identity of the second lower priority RAN (including, perhaps, an identity of where a control channel or traffic channel can be found for that second lower priority RAN) and an identity of the same incident response group or (different but) equivalent incident response group that the SU should join once registered with the second lower priority RAN. Once all members of the second incident response group are instructed to move to the second lower priority RAN (or perhaps after all members of the second incident response group are confirmed to have moved to the second lower priority RAN), processing proceeds from step 516 to optional step 518. Returning briefly to step 514, if the IC determines that all members of the second incident response group are already registered with the second lower priority RAN, processing may proceed to optional step 518. At optional step 518, additional steps similar to steps 506-510 and 512-516 could be executed for additional higher, lower, or intermediate priority RANs and/or additional higher, lower, or intermediate priority incident response groups.

At optional step 520, the IC may detect a trigger, perhaps via a user interface or received from some other SU or dispatch console, indicating that the incident has ended. Responsive to detecting the trigger, the SU may cause additional instruction messages to be sent to all SUs responding to the incident (or, in some embodiments, only those SUs that were previously instructed to move to a different RAN in steps 510 and/or 516) instructing the receiving SUs to return to their prior configuration before the incident or before receiving the instruction message from the IC, perhaps using initial RAN and incident response group information stored by the respective SUs prior to moving to the new RAN.

While FIG. 5 sets forth a particular order of steps, several of those steps can be executed in different orders without departing of the scope of this disclosure. For example, steps 502 and 504 can be reversed or executed in parallel. Further, steps 506-510 and steps 512-516 can be reversed or executed in parallel. Other possibilities exist as well.

FIG. 6 sets forth a method 600 executable at a SU, such as SU 401, for dynamically reconfiguring RAN use across a plurality of different RANs in a particular geographic area associated with an incident scene. The SU is initially assumed to be located outside of the particular geographic area, for example outside of the incident scene boundary 104 of FIG. 1, and at step 602, attaches to an initial RAN available outside of the incident scene boundary 104 and at step 604, joins a first incident response group on the initial RAN. For example, the SU may be associated with a fire response group or a traffic control response group and may be initially attached to a DMR RAN. At step 606, the SU receives notice of an incident, perhaps via a dispatch console or via another member of the first incident response group, and proceeds towards the incident scene.

At step 608, upon arrival at or near the particular geographic area (e.g., in one example, upon approaching or crossing the incident boundary 104 of FIG. 1), the SU receives an instruction message from an IC computing device, perhaps disposed within the same initial RAN as the SU or some other RAN or IP network coupled to the SU's initial RAN, instructing the SU to detach from the initial RAN and register with a first higher priority or second lower priority RAN, e.g., perhaps depending on the type of incident and/or the priority of the incident response group to which the SU belongs, among other factors. For example, assuming the first incident response group is a fire responder group and has a higher priority level of 1 as set forth in the look-up table example above, the SU may be directed to attach to a higher priority RAN such as an LMR RAN. In another example, and assuming the first incident response group is a traffic control response group and has a lower priority level of 3 as set forth in the look-up table example above, the SU may be directed to attach to a second lower priority RAN such as an LTE RAN. Other possibilities exist as well.

The SU may be directed to use information contained within the instruction message to locate a control or traffic channel of the first higher or second lower priority RAN and to attach to the first higher or second lower priority RAN. Additionally, the SU may also be directed to use group identification information contained within the instruction message to join a same or (different but) equivalent first incident response group on the first higher or second lower priority RAN.

At step 610, the SU, responsive to receiving the instruction message, automatically detaches from the initial RAN and registers with the first higher or second lower priority RAN as instructed in the message, perhaps rejoining the same or equivalent first incident response group that it was joined to in the initial RAN or a different but equivalent response group as instructed in the instruction message. The SU may use information contained within the instruction message to locate the control or traffic channel of the first higher or second lower priority RAN. Additionally, the SU may use group identification information contained within the instruction message to join a same or (different but) equivalent first incident response group on the first higher or second lower priority RAN.

The SU may then continue to communicate with the first incident response group (or equivalent group) via the first higher or second lower priority RAN. In some embodiments, and prior to detaching from the initial RAN, the SU may store information regarding the identity of the initial RAN and/or of the first incident response group for use in returning to its prior configuration after the incident is over or after departing the area of the particular geographic area.

At optional step 612, the SU may receive notice from the IC that the incident has ended, or may detect that it is departing the area at or near the particular geographic area (e.g., perhaps via periodic or continuous monitoring of its location via a GPS or triangulation method), responsive to either of which the SU may attempt to return to its prior configuration, perhaps using initial RAN and first incident response group information stored prior to moving to the first higher priority or second lower priority RAN, and re-register with the initial RAN and rejoin the first incident response group on the initial RAN.

III. CONCLUSION

In accordance with the foregoing, a dynamically reconfigured incident scene communication method and device is disclosed that allows for dynamic reconfiguration of groups of incident response SUs to use higher or lower priority RANs based on one or more of the type of incident, the type of incident response group, the types of available RANs that provide sufficient coverage in a particular geographic area associated with the incident scene, the relative priorities of those available RANs, and the relative priorities of the incident response groups. As a result, a more efficient, robust, and adaptable communications system can be provided at a varying number and type of incidents, improving response times and communication capabilities of incidence response groups. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for dynamically reconfiguring subscriber unit (SU) usage of radio access networks, the method comprising:

identifying, based at least on a type of incident occurring within a particular geographic area, a first incident response group of SUs having a first higher priority for responding to the incident and a second incident response group of SUs having a second lower priority for responding to the incident;

identifying a first higher priority radio access network, of a first network type, having a sufficient coverage level across the particular geographic area and a second lower priority radio access network, of a second network type different from the first, having a sufficient coverage level across the particular geographic area;

assigning the first incident response group to the first higher priority radio access network and assigning the second incident response group to the second lower priority radio access network; and instructing first SUs that are members of the first incident response group and not already registered with the first higher priority radio access network to move to the first higher priority radio access network by transmitting a message, via respective radio access networks other than the first higher priority radio access network, to move to the first higher priority radio access network identified in the message.

2. The method of claim 1, further comprising instructing second SUs that are members of the second incident response group and registered with the first higher priority radio access network to move to the second lower priority radio access network.

3. The method of claim 2, wherein instructing second SUs that are members of the second incident response group and registered with the first higher priority radio access network to move to the second lower priority radio access network comprises transmitting a message, via the first higher priority radio access network, to move to the second lower priority radio access network identified in the message.

4. The method of claim 1, wherein the first higher priority radio access network is one of a land mobile radio (LMR) radio access network and a digital mobile radio (DMR) radio access network.

5. The method of claim 1, wherein the second lower priority radio access network is one of a digital mobile radio (DMR) radio access network and a long term evolution (LTE) radio access network.

6. The method of claim 1, wherein the first incident response group is a direct incident response group selected from a police, fire, and medical incident response group and the second incident response group is a supporting incident response group selected from a utility, traffic control, and crowd control incident response group.

7. The method of claim 1, further comprising:
identifying, based at least on the type of incident, a third incident response group;
identifying a third medium priority radio access network having sufficient coverage across the particular geographic area, the third medium priority radio access network having a priority lower than the first radio access network but greater than the second radio access network; and
assigning the third incident response group to the third medium priority radio access network.

8. The method of claim 7, further comprising instructing third SUs that are members of the third incident response group and registered with the first higher priority radio access network to move to the third medium priority radio access network and instructing third SUs that are members of the third incident response group and registered with the second lower priority radio access network to move to the third medium priority radio access network.

9. The method of claim 7, wherein the first higher priority radio access network is a land mobile radio (LMR) radio access network, the second lower priority radio access network is a long term evolution (LTE) radio access network, and the third medium priority radio access network is a digital mobile radio (DMR) radio access network.

10. The method of claim 1, further comprising, after identifying the first incident response group and the first higher priority radio access network but prior to assigning the first incident response group to the first higher priority radio access network, determining that each first SU that is a member of the first incident response group is capable of communicating via the first higher priority radio access network.

11. The method of claim 1, further comprising, prior to assigning the first incident response group to the first higher priority radio access network:
identifying a third highest priority radio access network having sufficient coverage across the particular geographic area and having a priority higher than the first higher priority radio access network;
determining that at least one first SU that is a member of the first incident response group is not capable of communicating via the third highest priority radio access network, and responsively refraining from assigning the first incident response group to the third highest priority radio access network.

12. The method of claim 1, wherein the identifying the first incident response group and the second incident response group is further based on one or more of a size of the incident, a priority of the incident relative to other incidents, and a location of the incident.

13. The method of claim 1, further comprising:
identifying a third radio access network available within the particular geographic area; and
refraining from assigning either of the first and second incident response groups to the third radio access network responsive to a determination that one of (i) the third radio access network has insufficient coverage across the particular geographic area relative to a minimum coverage threshold level, (ii) the third radio access network has insufficient radio frequency (RF) resources to support a number of SUs in the first or second incident response group, (iii) one or more SUs in the first or second incident response group is not capable of communicating via the third radio access network, (iv) the third radio access network cannot provide security controls required by the first or second incident response group, (v) the third radio access network is a commercial network that requires remuneration and the first or second incident response group cannot comply with the requirement, and (vi) the third radio access network has insufficient service availability due to a failure or due to being in a maintenance mode and thus cannot provide a required service to the first or second incident response group.

14. The method of claim 1, further comprising detecting an end of incident trigger and responsively instructing at least those first and second SUs that were moved from an initial radio access network to a different radio access network to return to the initial radio access network.

15. An incident commander computing device for dynamically reconfiguring subscriber unit (SU) radio access network usage across a particular geographic area associated with an incident scene, the incident commander computer device configured to:

identify, based at least on a type of incident occurring within a particular geographic area, a first incident response group of SUs having a first higher priority for responding to the incident and a second incident response group of SUs having a second lower priority for responding to the incident;
   identify a first higher priority radio access network, of a first network type, having a sufficient coverage level across the particular geographic area and a second lower priority radio access network, of a second network type different from the first, having a sufficient coverage level across the particular geographic area;
   assign the first incident response group to the first higher priority radio access network and assign the second incident response group to the second lower priority radio access network;
and
instruct first SUs that are members of the first incident response group and not already registered with the first higher priority radio access network to move to the first higher priority radio access network by transmitting a message, via respective radio access networks other than the first higher priority radio access network, to move to the first higher priority radio access network identified in the message.

16. The incident commander computing device of claim 15, further configured to instruct second SUs that are members of the second incident response group and registered with the first higher priority radio access network to move to the second lower priority radio access network.

17. The incident commander computing device of claim 15, further configured to detect an end of incident trigger and responsively instruct at least those first and second SUs that were moved from an initial radio access network to a different radio access network to return to the initial radio access network.

* * * * *